United States Patent
Kwon

(10) Patent No.: US 11,763,475 B2
(45) Date of Patent: Sep. 19, 2023

(54) DISHWASHER AND METHOD FOR ACQUIRING THREE-DIMENSIONAL IMAGE THEREOF

(71) Applicant: LG Electronics Inc., Seoul (KR)

(72) Inventor: Baekeun Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 63 days.

(21) Appl. No.: 17/480,426

(22) Filed: Sep. 21, 2021

(65) Prior Publication Data
US 2022/0092808 A1 Mar. 24, 2022

(30) Foreign Application Priority Data
Sep. 21, 2020 (KR) .......................... 10-2020-0121679

(51) Int. Cl.
*G06T 7/55* (2017.01)
*H04N 13/254* (2018.01)
(Continued)

(52) U.S. Cl.
CPC ............ *G06T 7/55* (2017.01); *A47L 15/4246* (2013.01); *A47L 15/4295* (2013.01); *A47L 15/46* (2013.01);
(Continued)

(58) Field of Classification Search
CPC .. A47L 15/4246; A47L 15/4295; A47L 15/46; A47L 15/50; A47L 2401/04;
(Continued)

(56) References Cited

U.S. PATENT DOCUMENTS 8,971,576 B2 * 3/2015 Nakazato ................ G01S 17/42
382/103
10,952,591 B2 * 3/2021 Choi .................... A47L 15/0028
(Continued)

FOREIGN PATENT DOCUMENTS

CN 111557625 8/2020
DE 10048081 4/2002
(Continued)

OTHER PUBLICATIONS

Extended European Search Report in European Appln. No. 21197430.8, dated Feb. 11, 2022, 11 pages.

*Primary Examiner* — Boubacar Abdou Tchoussou
(74) *Attorney, Agent, or Firm* — Fish & Richardson P.C.

(57) ABSTRACT

A dishwasher includes: a tub, a sump disposed in the tub, a rack disposed in the sump and receiving an object, a plurality of lighting devices disposed at the tub and configured to illuminate an upper end portion of the rack, a measuring camera disposed at the tub and capturing an image of the upper end portion of the rack and generating an object image, and a controller configured to perform a first lighting control on the lighting devices, acquiring a first object image generated based on a first image of the rack captured by the measuring camera, performing a second lighting control on the lighting devices, acquiring a second object image generated based on a second image of the upper end portion of the rack captured by the object measuring camera, and generating a three-dimensional shape image of the object based on the first and second object images.

18 Claims, 13 Drawing Sheets

(51) Int. Cl.
  *G01B 11/24* (2006.01)
  *H04N 7/18* (2006.01)
  *A47L 15/42* (2006.01)
  *A47L 15/46* (2006.01)
  *A47L 15/50* (2006.01)

(52) U.S. Cl.
  CPC ............. *A47L 15/50* (2013.01); *G01B 11/24* (2013.01); *H04N 7/18* (2013.01); *H04N 13/254* (2018.05); *A47L 2401/04* (2013.01); *A47L 2501/36* (2013.01)

(58) Field of Classification Search
  CPC . G01B 11/24; G06T 7/55; H04N 7/18; H04N 13/254; F21V 33/0044; H05B 47/10
  See application file for complete search history.

(56) References Cited

U.S. PATENT DOCUMENTS

| | | | | |
|---|---|---|---|---|
| 11,026,559 | B2* | 6/2021 | Boyer | G06T 7/62 |
| 11,058,280 | B2* | 7/2021 | Yoshimoto | A47L 15/42 |
| 11,058,281 | B2* | 7/2021 | Fawaz | A47L 15/4295 |
| 11,158,072 | B2* | 10/2021 | Choi | G06T 7/11 |
| 11,185,209 | B2* | 11/2021 | Fawaz | A47L 15/4289 |
| 11,311,172 | B2* | 4/2022 | Terrádez Alemany | A47L 15/4295 |
| 11,343,418 | B2* | 5/2022 | Carlotto | F25D 29/00 |
| 11,484,183 | B2* | 11/2022 | Boyer | A47L 15/46 |
| 2010/0294311 | A1 | 11/2010 | Classen et al. | |
| 2012/0127480 | A1 | 5/2012 | Pilloud et al. | |
| 2013/0094706 | A1* | 4/2013 | Nakazato | G06T 7/55 382/103 |
| 2013/0329031 | A1 | 12/2013 | Miura et al. | |
| 2017/0041520 | A1* | 2/2017 | Carlotto | H04N 23/51 |
| 2019/0200841 | A1 | 7/2019 | Yoshimoto et al. | |
| 2019/0304087 | A1 | 10/2019 | Bovero | |
| 2019/0380559 | A1* | 12/2019 | Lee | H04W 72/23 |
| 2021/0093154 | A1* | 4/2021 | Boyer | A47L 15/4295 |

FOREIGN PATENT DOCUMENTS

| | | |
|---|---|---|
| DE | 102017212333 | 1/2019 |
| WO | WO2020125458 | 6/2020 |

* cited by examiner

DISHWASHER AND METHOD FOR ACQUIRING THREE-DIMENSIONAL IMAGE THEREOF

CROSS-REFERENCE TO RELATED APPLICATION

This application claims priority to and the benefit of Korean Patent Application No. 10-2020-0121679, filed on Sep. 21, 2020, the disclosure of which is incorporated herein by reference in its entirety.

TECHNICAL FIELD

The present disclosure relates to a dishwasher and a method for acquiring a three-dimensional image thereof.

BACKGROUND

A conventional dishwasher can remove leftovers and contaminants on cooking vessels and wash the cooking vessels by spraying high-pressure wash water after meals. The dishwasher perform a variety of steps to wash cooking vessels. In the first step, the dishwasher removes leftovers on cooking vessels by using friction between the cooking vessels and wash water without detergent simply by spraying the wash water, and then perform steps of main washing, rinsing, heating and rinsing, drying and the like to wash the cooking vessels completely. However, a degree to which cooking vessels are washed varies depending on the volume and the types of the cooking vessels placed in the dishwasher, positions at which the cooking vessels are held, and the like. Hereinafter, a structure of a conventional dishwasher is described with reference to FIG. 1.

FIG. 1 is a diagram illustrating a conventional dishwasher with a door open.

Referring to FIG. 1, an exterior of the dishwasher is comprised of a case 1 with a front open, and a door 2 configured to close the open front of the case. The case 1 and the door 2 at a front of the dishwasher can cover an inner space of the dishwasher to prevent wash water or detergent from escaping outside of the dishwasher while cooking vessels are washed.

The door 2 can be open while forming an angle of 90 degrees between the door 2 and the case 1. The dishwasher is provided with a tub 18 that is configured to accommodate wash water, a sump 16 that is disposed at a lower side of the tub and that is configured to collect wash water, filter foreign substances from the wash water, and spray the filtered wash water, a nozzle 14 connected to the sump and configured to spray the wash water into the tub while rotating, and racks 11 and 12 provided in the tub, having upper and lower racks, and configured to store a plurality of cooking vessels.

Leftovers having a large volume are first removed from the cooking vessels and collected on a surface of a lower side of the tub of the dishwasher. Then as the dishwasher proceeds with the following steps, leftovers having a small volume are removed from the cooking vessel one by one such that the cooking vessels are washed, and the removed leftovers are collected on the surface of the lower side of the tub of the dishwasher.

The dishwasher proceeds with the predetermined steps consecutively regardless of the types or volume of cooking vessels kept on the rack. For example, the predetermined steps do not include measuring the volume of the cooking vessels. Accordingly, when the volume of the cooking vessels accommodated is greater than a recommended volume, the cooking vessels are less likely to be washed completely. In this case, to wash the cooking vessels completely, the dishwasher may have to be operated again that would result wasting more energy. When the volume of the cooking vessels accommodated is less than the recommended volume, the predetermined steps may still waste energy even though the cooking vessels are washed sufficiently.

Additionally, a degree to which the cooking vessels are washed varies depending on a position of the cooking vessels on the rack and how the cooing vessels are held. For example, the cooking vessels held at a slant in an edge portion of the rack are less likely than the cooking vessels laid at a center of the rack with their concave portion facing down to be washed completely. To prevent this from happening, a user may have to consider a position to place cooking vessels and a direction in which the cooking vessels are held. Additionally, when the user places the cooking vessels in any position of the rack, or when the cooking vessels are moved to a corner of the rack due to hydraulic pressure of wash water, the cooking vessels are not completely washed.

SUMMARY

The present disclosure is directed to generate three-dimensional shapes of cooking vessels kept on a rack, perform different washing steps depending on the types and volume of the cooking vessels kept on the rack, and save energy based on an efficient wash.

The present disclosure is also directed to ascertain the positions, density, and the like of the cooking vessels kept on the rack, control an amount of wash water to be used, wash time, and a wash direction, and improve wash performance based on intensive wash toward a position where the cooking vessels are placed.

According to one aspect of the subject matter described in this application, a dishwasher can include a case that defines an exterior of the dishwasher and that has an opening at a front side of the case, a door configured to open and close the opening of the case, a tub that is configured to receive water, a sump that is disposed in the tub, a rack that is disposed in the sump and that is configured to receive an object, a plurality of lighting devices that are disposed at a first position of an inner surface of the tub and that are configured to illuminate an upper end portion of the rack, a measuring camera that is disposed at a second position of the inner surface of the tub and that is configured to capture an image of the upper end portion of the rack and generate an object image, and a controller. The controller can be configured to control operations of the dishwasher by: performing a first lighting control on the plurality of lighting devices to illuminate the upper end portion of the rack, acquiring, based on the first lighting control being performed, a first object image generated as a result of capturing of a first image of the upper end portion of the rack by the measuring camera, performing a second lighting control over the plurality of lighting devices to illuminate the upper end portion of the rack, acquiring, based on the second lighting control being performed, a second object image generated as a result of capturing of a second image of the upper end portion of the rack by the object measuring camera, and generating a three-dimensional shape image of the object in the rack based on the first object image and the second object image.

Implementations according to this aspect can include one or more of the following features. For example, the controller can be configured to calculate a lighting distance from each pixel included in the first object image or the second object image, generate a reference point by using a coordinate of the measuring camera, coordinates of the plurality of lighting devices, and the lighting distance, calculate a coordinate of a candidate reflection point in a three-dimensional space by using the coordinate of the measuring camera and the reference point, determine a final reflection point based on the candidate reflection point, and generate a three-dimensional shape image of the object based on the determined final reflection point.

In some examples, the controller can be configured to calculate a first lighting distance based on a first pixel that is a single pixel selected from pixels included in the first object image, and calculate a second lighting distance based on a second pixel that is at the same position as the first pixel among pixels included in the second object image. In some examples, the controller can be configured to extract a first flat surface including the measuring camera and a first lighting device and a second lighting device of the plurality of lighting devices, and generate a first reference point and a second reference point by using the first lighting distance, the second lighting distance, and the first flat surface.

In some implementations, the controller can be configured to extract a second flat surface that is defined by a set of points at a center between a three-dimensional coordinate of the first reference point and a three-dimensional coordinate of the measuring camera, and calculate a coordinate of a first candidate reflection point in the three-dimensional space based on the measuring camera and the second flat surface. In some examples, the controller can be configured to calculate a coordinate of a second reference point in the three-dimensional space by using the first lighting distance, the second lighting distance, and the first flat surface, extract a third flat surface that is defined by a set of points at a center between a three-dimensional coordinate of the second reference point and a three-dimensional coordinate of the measuring camera, and calculate a coordinate of a second candidate reflection point in the three-dimensional space based on the measuring camera and the third flat surface.

In some examples, the controller can be configured to determine a first cross point and a second cross point that are defined at cross points where (i) points placed in the first flat surface and at a first lighting distance from the first lighting device meet (ii) points placed in the first flat surface and at a second lighting distance from the second lighting device, a first distance from the first cross point to the measuring camera being greater than a second distance from the second cross point to the measuring camera, determine the first cross point as the first reference point, calculate a coordinate of the first reference point, and determine the second cross point as the second reference point, and calculate a coordinate of the second reference point.

In some examples, the controller can be configured to calculate a first normal vector connecting the first candidate reflection point and a first midpoint, calculate a second normal vector connecting the second candidate reflection point and a second midpoint, calculate a third normal vector from a third pixel and calculate a fifth normal vector from a fifth pixel in terms of the third pixel and the fifth pixel consecutively adjacent to the first pixel, calculate a fourth normal vector from a fourth pixel and calculate a sixth normal vector from a sixth pixel in terms of the fourth pixel and the sixth pixel consecutively adjacent to the second pixel, calculate a first angle value based on a comparison between the first normal vector and the third normal vector, and calculate a second angle value based on a comparison between the second normal vector and the fourth normal vector.

In some implementations, the controller can be configured to calculate a third angle value based on a comparison between the third normal vector and the fifth normal vector, calculate a fourth angle value based on a comparison between the fourth normal vector and the sixth normal vector, determine, based on the first angle value matching the third angle value and the second angle value not matching the fourth angle value, the first candidate reflection point as a final reflection point, and determine, based on the first angle value not matching the third angle value and the second angle value matching the fourth angle value, the second candidate reflection point as a final reflection point.

In some implementations, based on the second position being a lateral surface of the tub, the first position can be above the second position, at least two lighting devices can be disposed at one of two spaces set by a reference surface set in the tub, and at least three lighting devices can be disposed in the tub. In some implementations, based on the second position being an upper portion of the tub, the first position and the second position can be at the same height with respect to a bottom of the tub, and an angle among the plurality of lighting devices is 90 degrees or greater with respect to the measuring camera.

In some examples, the first lighting control and the second lighting control can include controlling the plurality of lighting devices such that the plurality of lighting devices are consecutively turned on and off or brightness of the plurality of lighting devices is adjusted.

According to another aspect of the subject matter described in this application, a method for acquiring a three-dimensional image by a dishwasher can include performing a first lighting control on a plurality of lighting devices disposed at a first position of an inner surface of a tub, acquiring, based on the first lighting control being performed, a first object image generated as a result of capturing of a first image of an upper end portion of a rack by a measuring camera disposed at a second position, performing a second lighting control on the plurality of lighting devices, acquiring, based on the second lighting control being performed, a second object image generated as a result of capturing of a second image of the upper end portion of the rack by the measuring camera, and generating a three-dimensional shape image of an object held in the rack based on the first object image and the second object image.

Implementations according to this aspect can include one or more of the following features. For example, generating a three-dimensional shape image of the object can include calculating a lighting distance from each pixel included in the first object image or the second object image, generating a reference point by using a coordinate of the measuring camera, coordinates of the plurality of lighting devices, and the lighting distance, calculating a coordinate of a candidate reflection point in a three-dimensional space by using the coordinate of the measuring camera and the reference point, determining a final reflection point based on the candidate reflection point, and generating a three-dimensional shape image of the object based on the determined final reflection point.

In some implementations, calculating a lighting distance from each pixel can include calculating a first lighting distance based on a first pixel that is a single pixel selected from pixels included in the first object image, and calculating a second lighting distance based on a second pixel that is at the same position as the first pixel among pixels included in the second object image. In some examples, generating a reference point can include extracting a first flat surface including the measuring camera and a first lighting device and a second lighting device of the plurality of lighting devices, and generating a first reference point and a second reference point by using the first lighting distance, the second lighting distance, and the first flat surface.

In some examples, calculating a coordinate of a reflection point in a three-dimensional space can include extracting a second flat surface that is defined by a set of points at a center between a three-dimensional coordinate of the first reference point and a three-dimensional coordinate of the measuring camera, and calculating a coordinate of a first candidate reflection point in the three-dimensional space based on the measuring camera and the second flat surface.

In some implementations, the method can further include calculating a coordinate of a second reference point in the three-dimensional space by using the first lighting distance, the second lighting distance, and the first flat surface, extracting a third flat surface that is defined by a set of points at a center between a three-dimensional coordinate of the second reference point and a three-dimensional coordinate of the measuring camera, and calculating a coordinate of a second candidate reflection point in the three-dimensional space based on the measuring camera and the third flat surface. In some examples, calculating a coordinate of a first reference point in the three-dimensional space can include determining a first cross point and a second cross point that are defined at cross points where (i) points placed in the first flat surface and at a first lighting distance from the first lighting device meet (ii) points placed in the first flat surface and at a second lighting distance from the second lighting device, a first distance from the first cross point to the measuring camera being greater than a second distance from the second cross point to the measuring camera, determining the first cross point as the first reference point, calculating a coordinate of the first reference point, determining the second cross point as the second reference point, and calculating a coordinate of the second reference point.

In some implementations, the method can further include calculating a first normal vector connecting the first candidate reflection point and a first midpoint, calculating a second normal vector connecting the second candidate reflection point and a second midpoint, calculating a third normal vector from a third pixel and calculating a fifth normal vector from a fifth pixel in terms of the third pixel and the fifth pixel consecutively adjacent to the first pixel, calculating a fourth normal vector from a fourth pixel and calculating a sixth normal vector from a sixth pixel in terms of the fourth pixel and the sixth pixel consecutively adjacent to the second pixel, calculating a first angle value based on a comparison between the first normal vector and the third normal vector, and calculating a second angle value based on a comparison between the second normal vector and the fourth normal vector. In some examples, determining a final reflection point can include calculating a third angle value based on a comparison between the third normal vector and the fifth normal vector, calculating a fourth angle value based on a comparison between the fourth normal vector and the sixth normal vector, determining, based on the first angle value matching the third angle value and the second angle value not matching the fourth angle value, the first candidate reflection point as a final reflection point, and determining, based on the first angle value not matching the third angle value and the second angle value matching the fourth angle value, the second candidate reflection point as a final reflection point.

In some implementations, based on the second position being a lateral surface of the tub, the first position can be above the second position, at least two lighting devices can be disposed at one of two spaces set by a reference surface set in the tub, and at least three lighting devices can be disposed in the tub. In some implementations, based on the second position being an upper portion of the tub, the first position and the second position can be at the same height with respect to a bottom of the tub, and an angle among the plurality of lighting devices can be 90 degrees or greater with respect to the measuring camera.

In some examples, the first lighting control and the second lighting control can include controlling the plurality of lighting devices such that the plurality of lighting devices are consecutively turned on and off or brightness of the lighting devices is adjusted.

DETAILED DESCRIPTION

Figure 1:
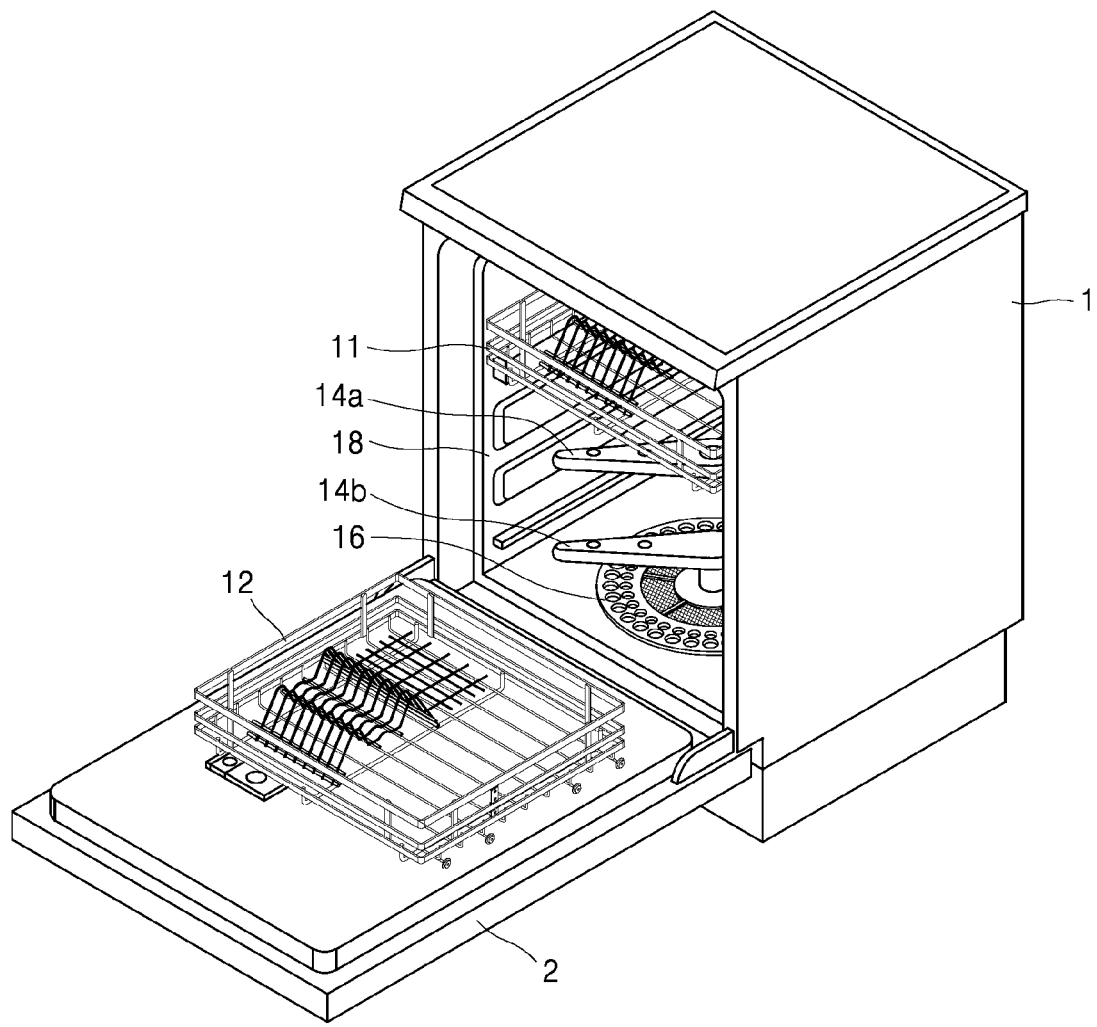
FIG. 1 is a diagram illustrating a conventional dishwasher with a door open.
Figure 2:
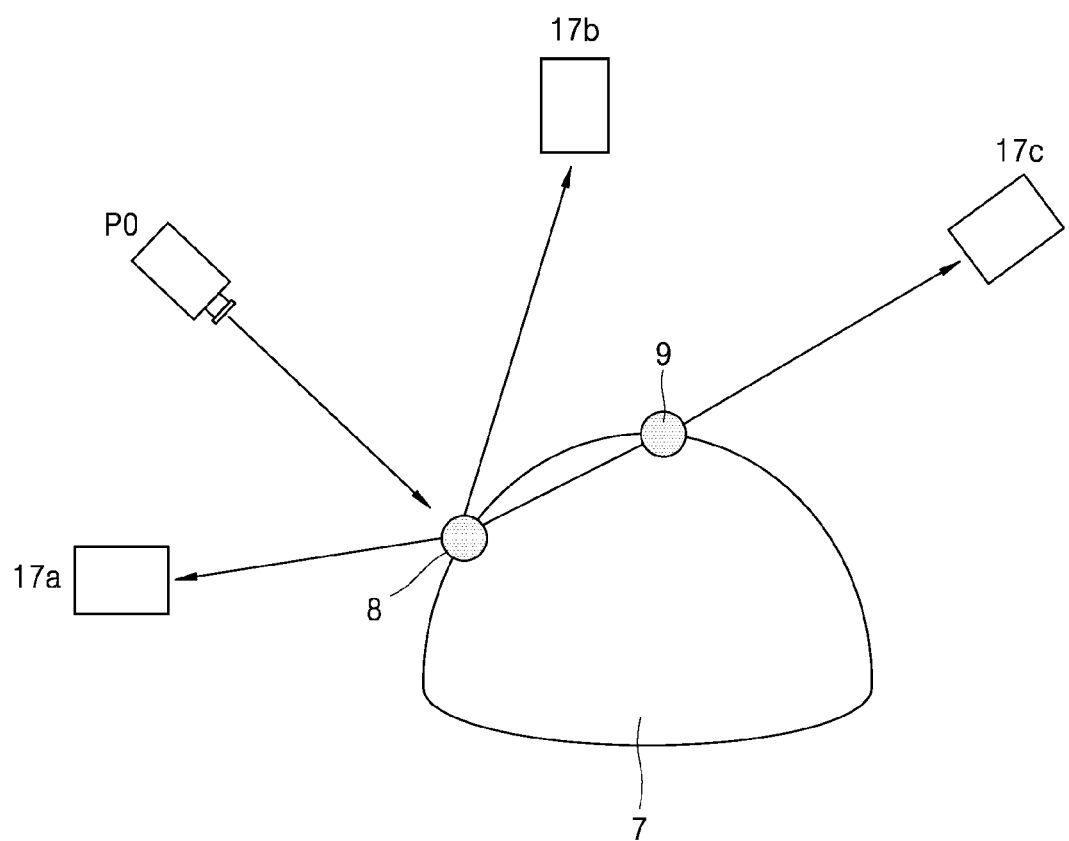
FIG. 2 is a diagram illustrating a plurality of lighting devices at different positions and a vessel measuring camera capturing an image of reflected light rays reflecting off a cooking vessel by the plurality of lighting devices.
Figure 3:
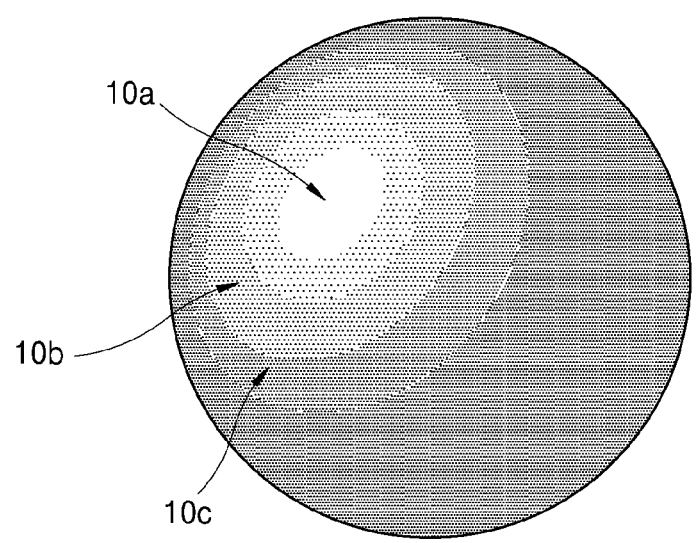
FIG. 3 is a diagram illustrating amounts of light rays on a surface of an object when the light rays strike the object.

FIG. 2 is a diagram illustrating a plurality of lighting devices at different positions and a vessel measuring camera capturing an image of reflected light rays reflecting off a cooking vessel by the plurality of lighting devices, and FIG. 3 is a diagram illustrating amounts of light rays on a surface of an object when the light rays strike the object. Hereinafter, description is given with reference to FIGS. 2 and 3.

When light rays approach toward a boundary surface of two mediums, a first portion of light energy passes through the boundary surface, a second portion of the light energy is absorbed into the mediums, and a third portion of the light energy reflects. For example, the reflected light rays reflect in a reflect direction opposite to a direction in which the light rays do not pass through the boundary surface and strike. The camera can identify the object by using reflected light rays of light rays emitted by the lighting devices. The reflected light rays may fall into categories of that directly affect the shading of an object, and scattered light rays that affect the overall image brightness through light scattering.

Referring to FIG. 2, light rays emitted by each of the three lighting devices 17a, 17b, and 17c strike on a cooking vessel 7 and then reflect off the cooking vessel 7, and an amount of the reflected light rays can be captured by a camera P0. In some implementations, each of the three lighting devices 17a, 17b, and 17c can be configured to perform turn-on and turn-off operations and when a first lighting device 17a is turned on, a first measured point 8 may be the brightest, and a second measured point 9 may be the darkest, among measured points measured by the camera, as a result of direct reflection. When the first lighting device 17a is turned off and a third lighting device 17b is turned on, the second measured point 9 may be the brightest and the first measured point 8 may be the darkest among the measured points. When only the second lighting device 17c is turned on, a central portion between the first measured point 8 and the second measured point 9 may be measured to be the brightest while the first measured point 8 may not be affected by direct reflection because of a lighting angle but may be affected by scattered light.

Referring to FIG. 3, light rays emitted from the lighting device may directly reflect off a first area 10a and indirectly reflect off a second area 10b, and may not reflect off a third area 10c. An amount of the reflected light rays can decrease gradually from the first area 10a toward the third area 10c. Accordingly, an amount of light rays on a surface of an object may decrease.

As described above, the amount of the reflected light rays and the amount of the light rays on the surface of the object may vary depending on an incident angle of light, i.e., a position of the lighting device. Accordingly, a distance from the surface of the object to a center of the lighting device can be conversely calculated based on the amount of the light rays on the surface of the object. Additionally, since most of the cooking vessels stored in the dishwasher are ceramics having a smooth surface, a coordinate of a measured point in a three-dimensional space can be ascertained based on total reflection. A method for calculating the distance to the center of the lighting device is described below.

Figure 4:
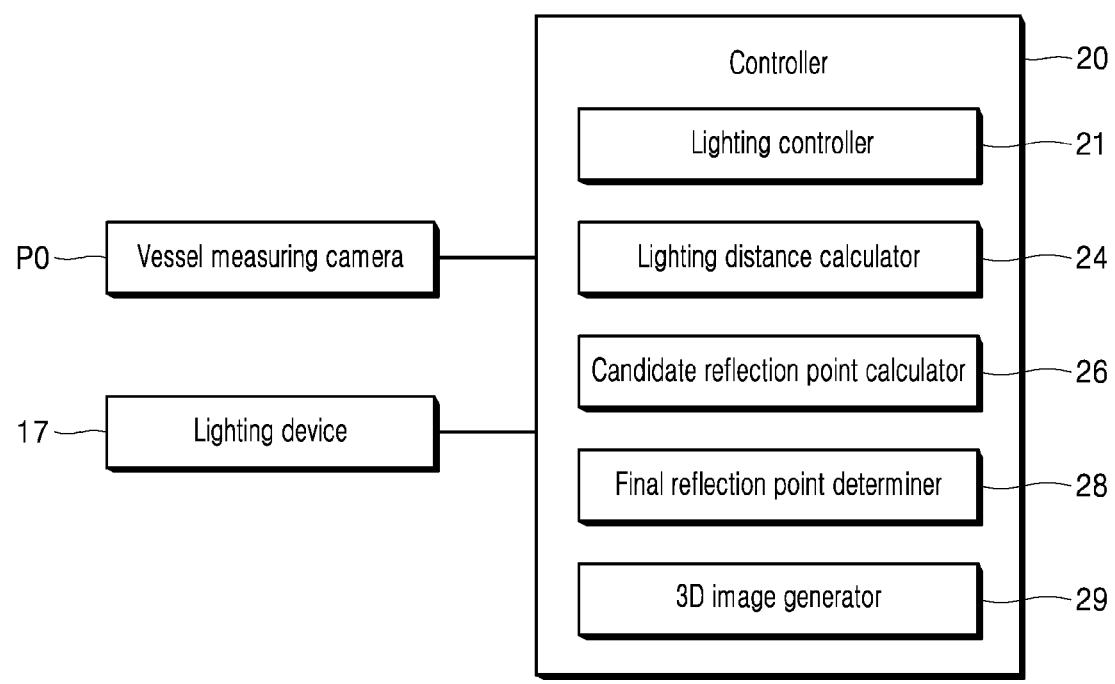
FIG. 4 is a block diagram illustrating an exemplary dishwasher.

FIG. 4 is a block diagram illustrating an exemplary dishwasher.

Referring to the drawing, the lighting device 17 can be disposed at a first position of an inner surface of a tub and light up an upper end portion of a rack. A plurality of lighting devices 17 can be provided, and a controller 20 can control operations of the lighting device 17.

A vessel measuring camera P0 can be disposed at a second position of the inner surface of the tub and capture an image of the upper end portion of the rack to generate an image of vessels. The vessel measuring camera P0 can include a device configured to convert an external optical image signal to an electric image signal by using an image sensor. For example, the device can include a complementary metal-oxide-semiconductor (CMOS) image sensor (CIS) or a charge-coupled device (CCD). The first position at which the lighting device 17 is disposed and the second position at which the vessel measuring camera PO is disposed are described below.

The controller 20 can include a lighting controller 21, a data storage 22, a lighting distance calculator 24, a candidate reflection point calculator 26, a final reflection point determiner 28, and a 3D shape image generator 29.

The lighting controller 21 can control the plurality of lighting devices. Specifically, the lighting controller 21 can turn on and off the lighting device 17 or control brightness of the lighting device 17. In some implementations, the lighting controller 21 can acquire different vessel images through the vessel measuring camera P0 while the plurality of lighting devices are controlled.

The lighting distance calculator 24 can calculate a lighting distance based on the vessel image acquired from the vessel measuring camera P0. For example, the lighting distance calculator 24 can calculate an amount of light rays on a surface of a cooking vessel from each pixel included in the vessel image to calculate a lighting distance of each pixel.

The candidate reflection point calculator 26 can generate a reference point by using a predetermined coordinate of the vessel measuring camera P0, coordinates of the plurality of lighting devices, and lighting distances in a three-dimensional space, and calculate a coordinate of a candidate reflection point by using the coordinate of the vessel measuring camera and the reference point. Additionally, the candidate reflection point calculator 26 can calculate coordinates of one or two reflection points from one of the pixels included in the vessel image. For example, the candidate reflection point calculator 26 can generate two reference points and calculate coordinates of two candidate reflection points when two lighting devices 17 are used, and can generate a reference point and calculate a coordinate of a candidate reflection point when three or more lighting devices 17 are used.

When the number of coordinates of a candidate reflection point generated from a single pixel is one, the final reflection point determiner 28 can determine the generated candidate reflection point as a coordinate of a final reflection point. When the number of coordinates of a candidate reflection point generated from a single pixel is two, the final reflection point determiner 28 can determine a coordinate of one of the two candidate reflection points as a coordinate of a final reflection point. For example, the final reflection point determiner 28 can calculate each normal vector by using the candidate reflection points generated from each pixel, calculate an angle value from each normal vector based on a curve of a surface of a cooking vessel, and determine a final reflection point. A method for determining a final reflection point is described below.

The 3D image generator 29 can combine coordinates of final reflection points generated from each pixel of a vessel image and generate a three-dimensional shape image of a cooking vessel.

Figure 5:
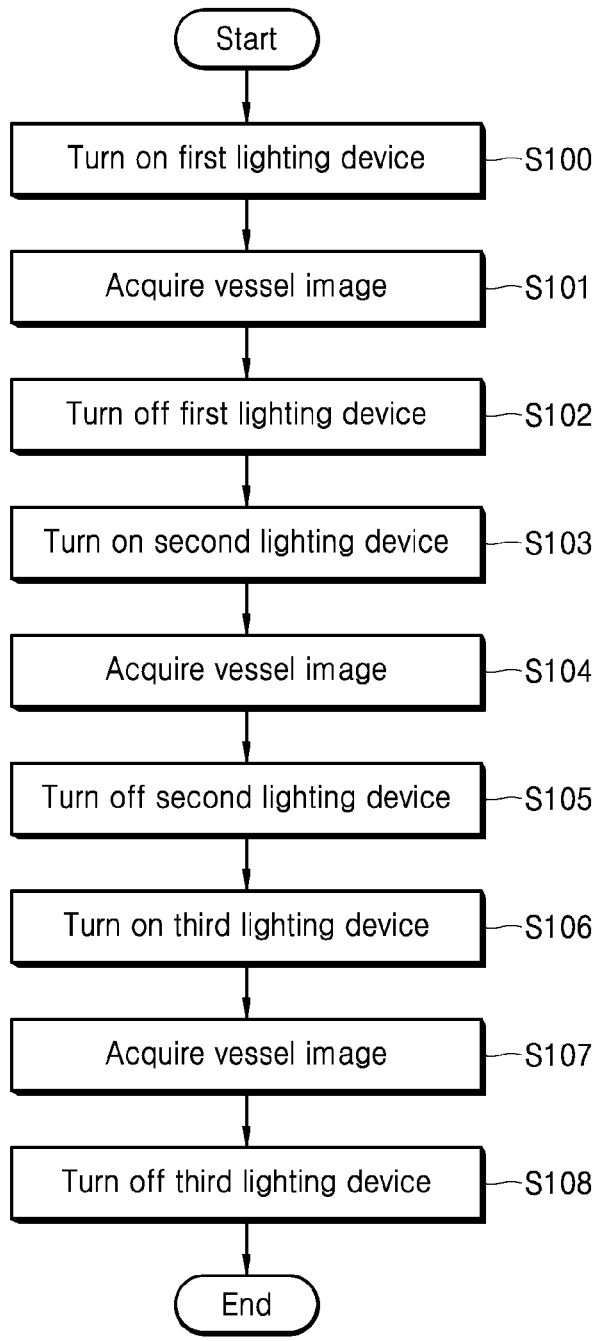
FIG. 5 is a flow chart illustrating a method by which a lighting controller turns on and off lighting devices.
Figure 6:
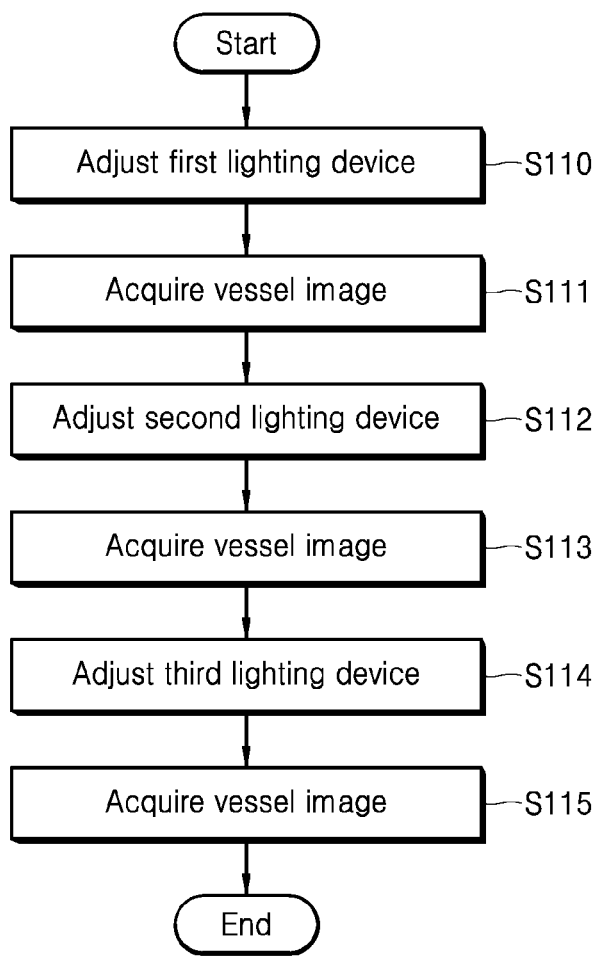
FIG. 6 is a flow chart showing a method by which the lighting controller controls illuminance of lighting devices.

FIG. 5 is a flow chart illustrating a method by which a lighting controller turns on and off lighting in one embodiment, and FIG. 6 is a flow chart illustrating a method by which the lighting controller controls illuminance of lighting in one embodiment. Hereinafter, a method of controlling lighting is described with reference to FIGS. 2, 5 and 6.

The lighting controller 21 can control the lighting devices 17. For example, the lighting controller 21 can perform first lighting control over the plurality of lighting devices disposed on the inner surface of the tub, and when acquiring a first vessel image generated as a result of the vessel measuring camera P0's capturing of an image of the upper end portion of the rack in the state in which the first lighting control is performed, the lighting controller 21 can perform second lighting control over the plurality of lighting devices. Then the lighting controller 21 can acquire a second vessel image as a result of the vessel measuring camera's capturing of an image of the upper end portion of the rack in the state in which the second lighting control is performed. The first lighting control and the second lighting control can be lighting control including the consecutive turn-on and turn-off of the plurality of lighting devices or the adjustment of brightness of the plurality of lighting devices.

FIG. 2 shows three lighting devices 17a, 17b, and 17c lighting up a cooking vessel. Hereinafter, three lighting devices are described as an example of the plurality of lighting devices but more or less lightning device can be used. Referring to FIG. 5, when the first lighting device 17a is powered on in a state in which the second lighting device 17b and the third lighting device 17c are off (S100), the lighting controller 21 can acquire a first vessel image generated as a result of the vessel measuring camera P0s' capturing of an image of the upper end portion of the rack (S101), and turn off the first lighting device 17a (S102). When the second lighting device 17b is turned on in a consecutive order (S103), the lighting controller 21 can acquire a second vessel image (S104) and turn off the second lighting device 17b (S105). Likewise, when the third lighting device 17c is turned on (S106), the lighting controller 21 can acquire a third vessel image (S107) and turn off the third lighting device 17c (S108). The lighting controller 21, as described above, can control the lighting devices disposed at different angles consecutively. Thus, the controller 20 can generate a three-dimensional shape image of a cooking vessel based on the acquired vessel image and generate a three-dimensional shape image more accurately as a result of the acquisition of a plurality of vessel images.

The lighting controller 21 can control the turn-on and turn-off of the lighting device based on whether power is supplied to the lighting device, and brightness of the lighting device based on a power supply in the state in which power is supplied to the lighting device. Referring to FIG. 6, the lighting controller 21 can adjust brightness of the first lighting device 17a to a higher brightness level under the first lighting control (S110) and acquire a first vessel image (S111), and then adjust the brightness of the first lighting device 17a to a lower brightness level (S112) and adjust brightness of the second lighting device 17b to a higher brightness level under the second lighting control and acquire a second vessel image (S113). Then, the lighting controller 21 can acquire a third vessel image (S115) under third lighting control (S114) in the same way. Herein, after acquiring the first vessel image, the lighting controller 21 can adjust the brightness of the second lighting device 17b only to a higher brightness level and acquire a second vessel image in the state in which the brightness of the first lighting device 17a is not adjusted to a lower brightness level. For example, the second vessel image can be acquired in the state in which the brightness of both the first lighting device 17a and the second lighting device 17b is adjusted to a higher brightness level.

In some implementations, the dishwasher can acquire a three-dimensional image based on the acquired vessel images as long as the lighting devices have different illuminance values as a result of the lighting control regardless of the turn-on and turn-off of the lighting devices.

In some implementations, the first lighting control and the second lighting control can include controlling a light source frequency of a lighting device. For example, the plurality of lighting devices disposed at different positions may not control the brightness of lighting devices, but may supply power to all of the lighting devices and control each lighting source frequency, i.e., wavelength of light, to be different. Thus, different vessel images can be acquired depending on light source frequencies without additional illuminance adjustments.

Figure 7:
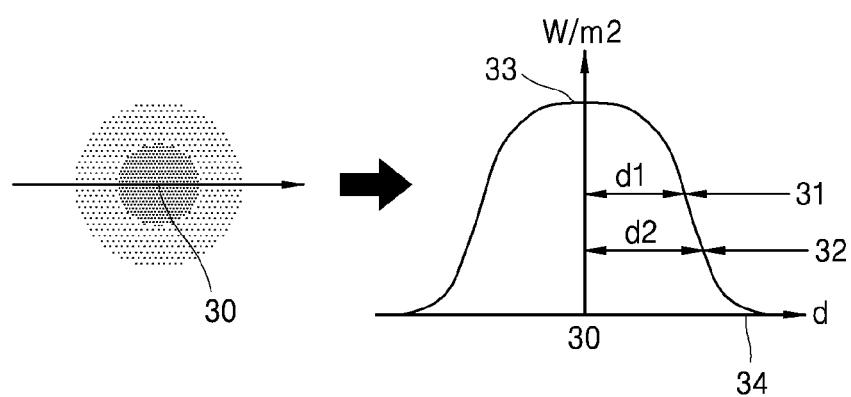
FIG. 7 is a graph illustrating a distribution of amount of light according to a lighting distance.

FIG. 7 is a graph illustrating a distribution of amount of light according to a lighting distance.

In FIG. 7, a point where the horizontal axis and the vertical axis meet denotes a center of a light source, i.e., a lighting center 30. The horizontal axis denotes a lighting distance (d), which is the distance from a lighting device, and the vertical axis denotes an amount of light (W/m2). As shown in FIG. 7, the amount of light varies according to the distance from the lighting device, the light amount distribution pattern is symmetrical on the left and right with respect to the center of lighting device, and the amount of light decreases as the distance from the center of lighting device increases. For example, the center 33 of the lighting device where the lighting distance d is 0 has the greatest amount of light, and amount of light is 0 or very small at a point 34 that is farthest from the lighting device.

The amount of light can be extracted from each pixel included in a vessel image acquired from the vessel measuring camera as a result of conversion of an optical image signal into an electric image signal. Each pixel has a different distance from a single light source. Accordingly, each pixel may have different amount of light. Additionally, pixels at the same position may have different amount of light since a different lighting device is used for each vessel image.

Using the relationship between the lighting distance and the amount of light as shown in FIG. 7, the lighting distance of the object can be calculated by measuring the amount of light of the object included in the image.

For example, assume that first and second vessel images are acquired as a result of control over two lighting devices. The lighting distance calculator 24 can calculate a first lighting distance d1 corresponding to the amount of light 31 of a first pixel that is any pixel included in a first vessel image based on distribution of amount of light as illustrated in FIG. 7, and calculate a second lighting distance d2 corresponding to the amount of light 32 of a second pixel that is a pixel at the same position as the first pixel among pixels included in the second vessel image. Then the candidate reflection point calculator 26 can generate a reference point prior to generation of a candidate reflection point.

Figure 8:
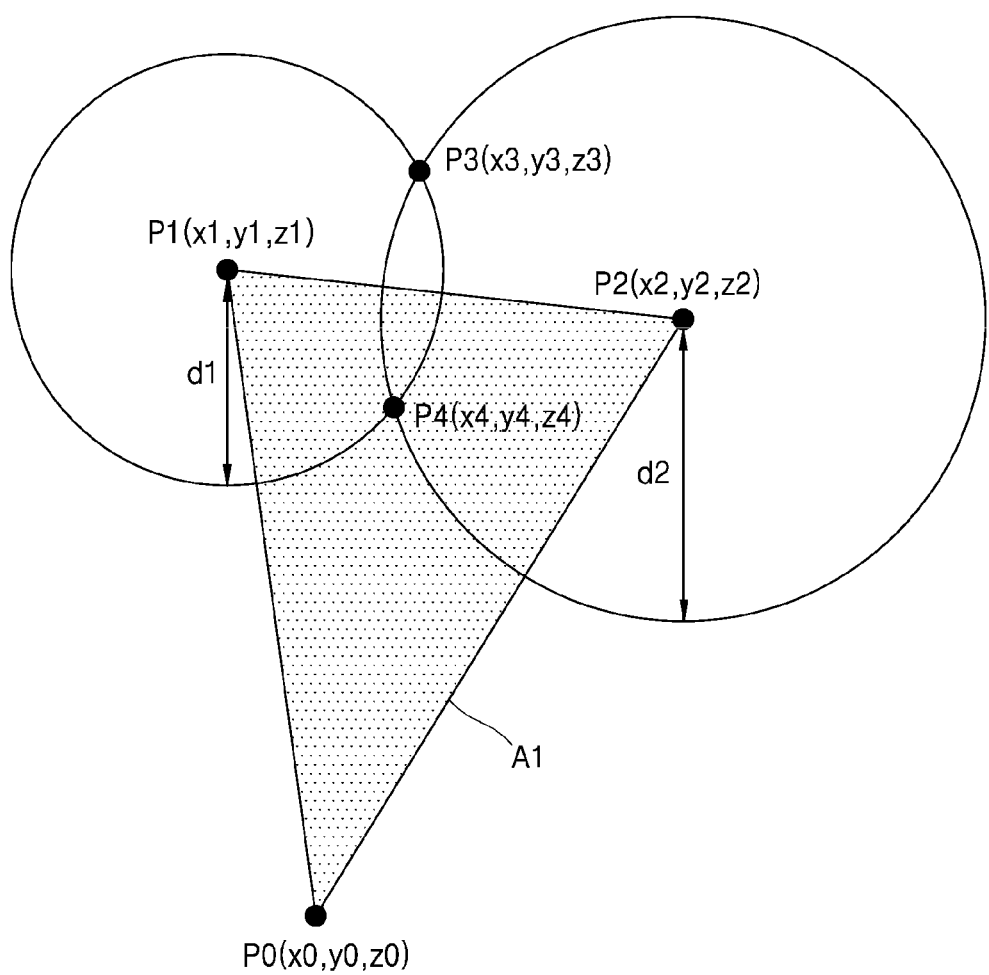
FIG. 8 is a diagram illustrating a view of a method by which a candidate reflection point calculator generates first and second reference points.
Figure 9:
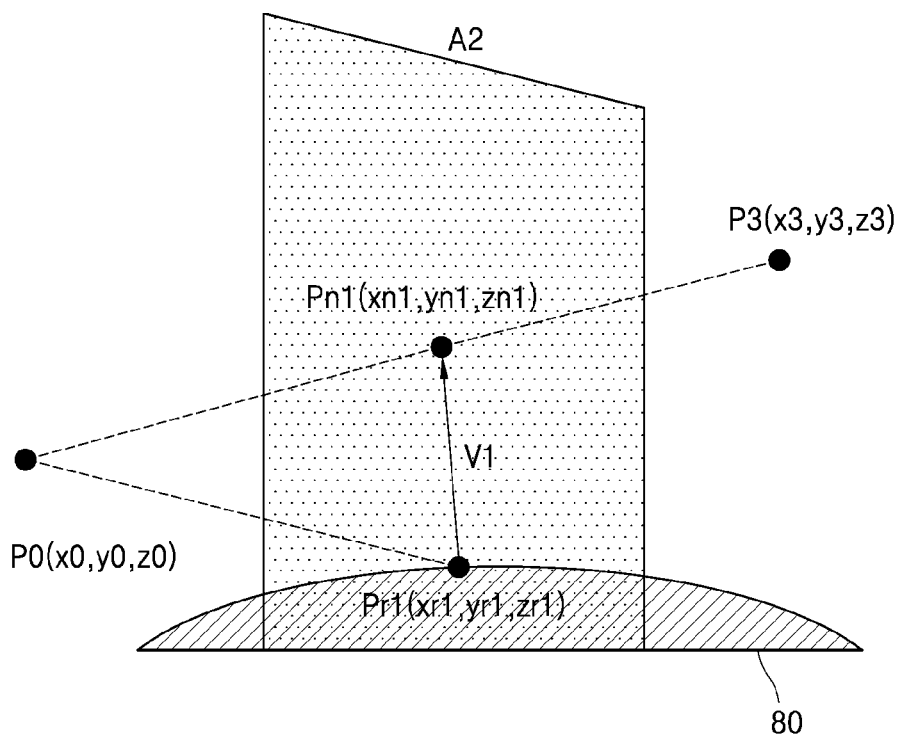
FIG. 9 is a diagram illustrating a view of a method by which a candidate reflection point calculator generates a first candidate reflection point by using a second flat surface and a vessel measuring camera.

FIG. 8 is a diagram illustrating a view of a method by which a candidate reflection point calculator generates first and second reference points, and FIG. 9 is a diagram illustrating a view of a method by which a candidate reflection point calculator generates a first candidate reflection point by using a second flat surface and a vessel measuring camera. Hereinafter, description is given with reference to FIGS. 8 and 9.

Referring to the drawing, in a three-dimensional space, a coordinate of the camera may be P0 (x0, y0, z0), a coordinate of the first lighting device may be P1 (x1, y1, z1), a coordinate of the second lighting device may be P2 (x2, y2, z2), and a coordinate of the third lighting device may be P3 (x3, y3, z3). The coordinates P0, P1, and P2 are respectively a predetermined value when the camera and the lighting devices are disposed for the first time. The candidate reflection point calculator 26 can generate a first flat surface A1 that is a single virtual flat surface including P0, P1, and P2.

In this case, in the three-dimensional space, when a set of points located at a first center distance d1 from P1 and a set of points located at a second center distance d2 from P2 meet each other to form a circle, the points located on the first plane A1 may only be P3 (x3, y3, z3) and P4 (x4, y4, z4).

Of the two cross points where points placed in the first flat surface and placed at the first lighting distance from the first lighting device meet points placed in the first flat surface and placed at the second lighting distance from the second lighting device, a cross point far from the vessel measuring camera is determined as a first reference point P3, and a three-dimensional coordinate P3 (x3, y3, z3) of the first reference point can be calculated. Additionally, of the two cross points where points placed in the first flat surface and placed at the first lighting distance from the first lighting device meet points placed in the first flat surface and placed at the second lighting distance from the second lighting device, a cross point near the vessel measuring camera can be determined as a second reference point P4, and a three-dimensional coordinate P4 (x4, y4, z4) of the second reference point P4 can be calculated.

In some implementations, coordinate values of two reference points are calculated in a three-dimensional space using two lighting devices. In some implementations, the coordinate value of the reference point can be calculated using three or more lighting devices. In this case, only the coordinate value of one reference point may be calculated by using the center value of the plurality of cross points as the coordinate value of the reference point.

FIG. 9 shows a reflection point Pr1 (xr1, yr1, zr1), a position P0 (x0, y0, z0) of the camera, a first reference point P3 (x3, y3, z3), a second flat surface A2, and a cooking vessel 80 laid with its convex surface facing up.

The second flat surface A2 is a virtual flat surface and denotes a set of points at the same distance between the camera P0 and the first reference point P3. Of points on the second flat surface A2, a point at a center of a linear distance from the vessel measuring camera P0 to the first reference point P3 is a first midpoint Pn1.

The candidate reflection point calculator 26 can calculate a coordinate Pr1 (xr1, yr1, zr1) of a first candidate reflection point by using the vessel measuring camera P0 and the second flat surface A2.

The candidate reflection point calculator 26 can extract a second midpoint P4 at a center of a linear distance from the camera P0 to the second reference point P4 and a third flat surface A3 that is a set of points at the same distance from the second reference point P4 and the vessel measuring camera P0. Additionally, of points on the third flat surface A3, a point at the center of the linear distance from the vessel measuring camera P0 to the second reference point P4 is a second midpoint Pn2. The candidate reflection point calculator 26 can calculate a coordinate Pr2 (xr2, yr2, zr2) of a second candidate reflection point by using the vessel measuring camera P0 and the third flat surface A3.

Figure 10:
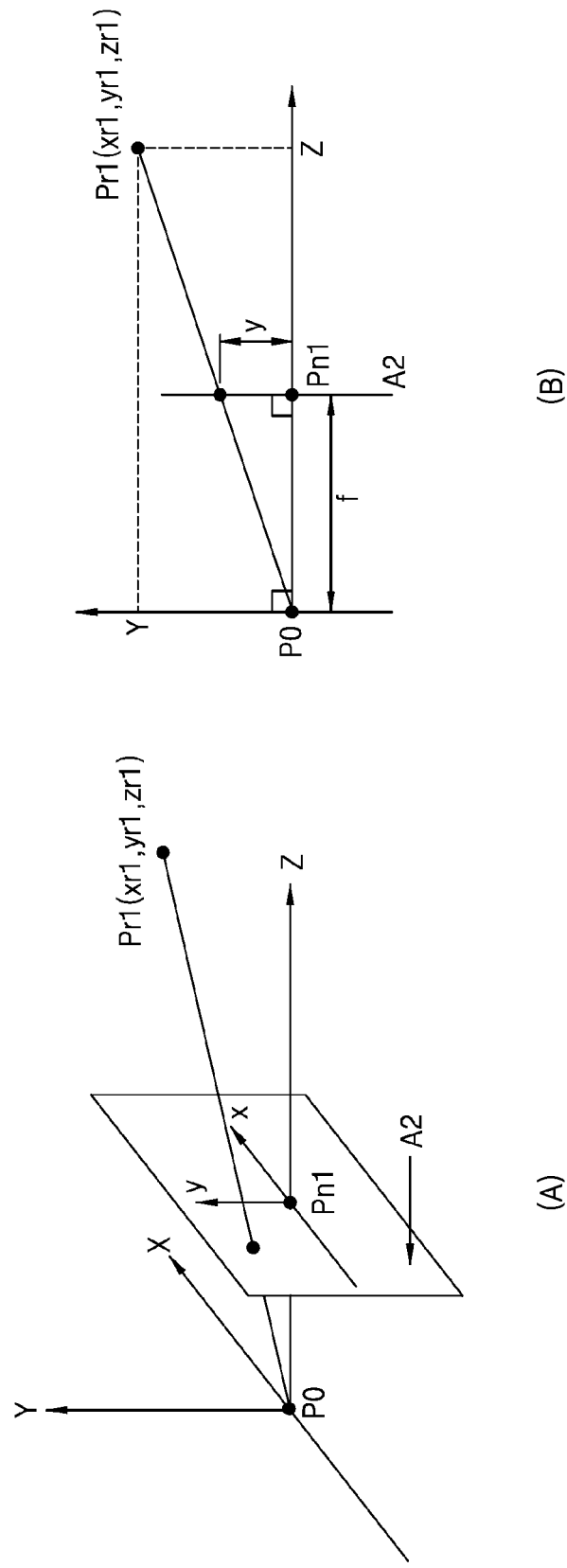
FIGS. 10A and 10B are diagrams illustrating a view of a method by which a candidate reflection point calculator generates a candidate reflection point.

FIGS. 10A and 10B are diagrams illustrating a view of a method by which a candidate reflection point calculator generates a candidate reflection point.

From a geometric perspective, positions at which points in a three-dimensional space are formed on a two-dimensional image can be determined based on a position and a direction of a camera at the time when the camera captures the image. The image captured by the camera is acquired as a result of projection of the points in the three-dimensional space onto the flat surface of the two-dimensional image. Conversely, a coordinate of the three-dimensional space can be acquired from the two-dimensional image as a result of camera calibration. In some implementations, the camera calibration process and the pinhole camera projection model may be applied to calculate a coordinate of a candidate reflection point in the three-dimensional space from a vessel image.

FIG. 10A is a diagram illustrating a perspective view of a relationship between a position P0 of the vessel measuring camera and the second flat surface A2, and FIG. 10B is a diagram illustrating a side view of a relationship between a position P0 of the vessel measuring camera and the second flat surface A2.

In FIGS. 10A and 10B, an optic axis direction in front of the vessel measuring camera is set to a Z-axis, an up-down direction of the camera is set to a Y-axis, and a left-right direction of the camera is set to an X-axis, with respect to a focal point P0 of the vessel measuring camera as an origin. FIG. 10A depicts a coordinate Pr1 (xr1, yr1, zr1) in a three-dimensional space and, an origin Pn1 (0,0) (i.e., a second midpoint) on the second flat surface A2, and a coordinate Pr1 (x,y) of the second flat surface, and f denotes a distance from a center of a lens of the vessel measuring camera to the second flat surface A2 (see FIG. 10B). In this case, a relationship between Pr1(x, y) of the second flat surface on which the image is projected in response to the coordinates Pr1 (xr1, yr1, zr1) in the three-dimensional space may be expressed as equation 1 hereunder.

$$f:zr1=x:xr1, f:zr1=y:yr1 \qquad \text{[Equation 1]}$$

Using equation 1, the coordinate Pr1 (xr1, yr1, zr1) of the first candidate reflection point in the three-dimensional space can be calculated based on the coordinate Pr1(x,y) on the second flat surface A2.

Likewise, using equation 2, the coordinate Pr2 (xr2, yr2, zr2) of the second candidate reflection point in the three-dimensional space can be calculated based on a coordinate Pr2 (x,y) of the third flat surface A3.

$$f:zr2=x:xr2, f:zr2=y:yr2 \qquad \text{[Equation 2]}$$

The coordinate of the first candidate reflection point and the coordinate of the second candidate reflection point, calculated by using the above equations, may differ from each other. Accordingly, one of coordinate of the first candidate reflection point and the coordinate of the second candidate reflection point may be determined as a coordinate of a final reflection point. If two or more lighting devices are used and a single reference point is only generated, a single candidate reflection point is only generated. Accordingly, the generated candidate reflection point can be determined as a final reflection point.

Figure 11:
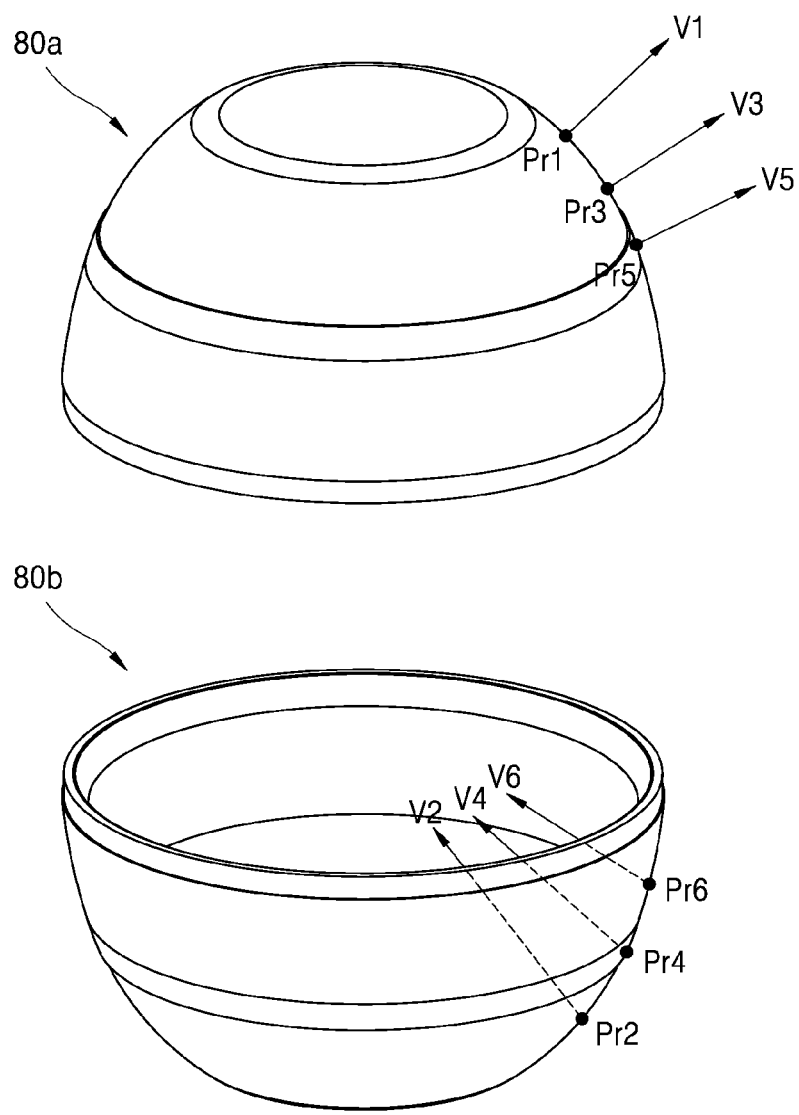
FIG. 11 is a diagram illustrating a view of a method by which a final reflection point determiner determines a final reflection point from a first candidate reflection point and a second candidate reflection point.

FIG. 11 is a diagram illustrating a view of a method by which a final reflection point determiner determines a final reflection point from a first candidate reflection point and a second candidate reflection point.

A three-dimensional shape image of a cooking vessel can be generated by combining candidate reflection points of all pixels. In this case, a surface of the same cooking vessel may look convex or concave due to perspective, causing a distortion. To remove the distortion, the final reflection point determiner 28 can determine a final reflection point based on continuity of each successive pixel of the first candidate reflection points and the second candidate reflection points. For example, continuity denotes continuity of a position and continuity of an angle, and to remove a distortion, continuity of an angle is needed. To determine continuity, a normal vector needs to be first calculated from each candidate reflection point.

Referring to FIGS. 9 and 11, the final reflection point determiner 28 can calculate a first normal vector V1 directed from the first midpoint Pn1 (xn1, yn1, zn1) to the first candidate reflection point Pr1 (xr1, yr1, zr1) in a perpendicular direction and calculate a second normal vector V2 directed from the second midpoint Pn2 (xn2, yn2, m2) to the second candidate reflection point Pr2 (xr2, yr2, zr2) in a perpendicular direction. For example, the first normal vector and the second normal vector can be calculated from a first pixel that is any pixel among pixels included in a vessel image.

In some implementations, a third normal vector V3 and a fourth normal vector V4 can be calculated from a second pixel adjacent to the first pixel, and a fifth normal vector V5 and a sixth normal vector V6 can be calculated from a third pixel adjacent to the second pixel and opposite the first pixel.

A vector refers to a physical quantity and has a size and direction. Accordingly, as a result of comparison between the first normal vector V1 and the third normal vector V3 adjacent to the first normal vector, calculated as described above, a first angle value can be calculated, and as a result of comparison between the second normal vector V2 and the fourth normal vector V4 adjacent to the second normal vector, a second angle value can be calculated.

Then, as a result of comparison between the third normal vector V3 and the fifth normal vector V5 adjacent to the third normal vector, a third angle value can be calculated, and the calculated third angle value can be compared with the first angle value. Additionally, as a result of comparison between the fourth normal vector V2 and the sixth normal vector V6 adjacent to the fourth normal vector, a fourth angle value can be calculated, and the calculated fourth angle value can be compared with the second angle value.

At a candidate reflection point where a distortion occurs, an angle value may not be maintained. Accordingly, a candidate reflection point where an angle value remains constant can be determined as a final reflection point. For example, when the first angle value matches the third angle value and the second angle value does not match the fourth angle value, the first candidate reflection point is determined as a final reflection point, and when the first angle value does not match the third angle value and the second angle value matches the fourth angle value, the second candidate reflection point is determined as a final reflection point.

When the candidate reflection point belongs to the boundary point of the cooking vessel, the first angle value does not match the third angle value and the second angle value does not match the fourth angle value. In this case, the final reflection point determiner 28 can search edge of the cooking vessel and limit a region of interest (ROI) to correct the error. As described above, a distortion can be removed by calculating normal vectors and angle values from candidate reflection points. Thus, the 3D image generator 29 can generate an accurate three-dimensional shape image of a cooking vessel.

Figure 12:
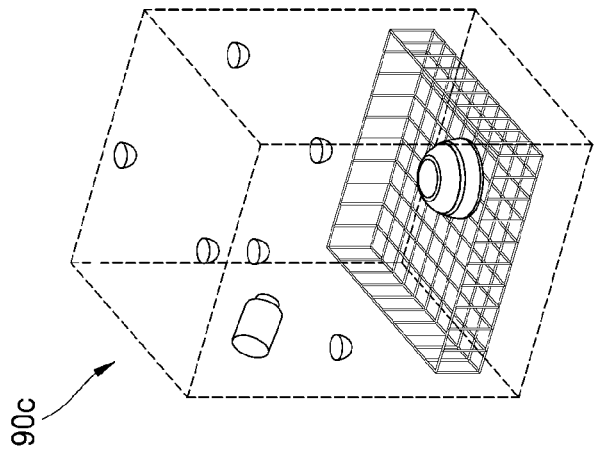
FIG. 12 is a diagram illustrating a view of a position at which the lighting device and the vessel measuring camera are disposed.
Figure 12:
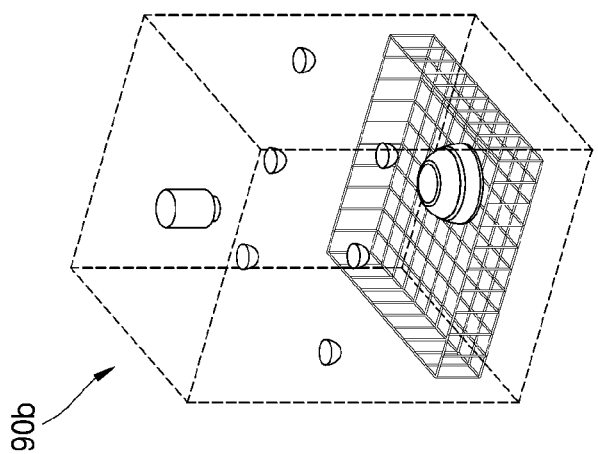
Figure 12:
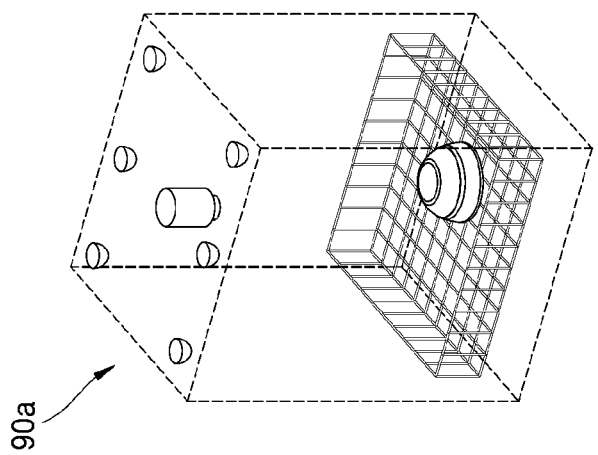

FIG. 12 is a diagram illustrating a view of a position at which the lighting device and the vessel measuring camera are disposed.

In some implementations, the tub in the dishwasher is a sealed space. When a lighting device lights up only a portion of a cooking vessel or disposed at a lower position than the vessel measuring camera, a blind spot where light rays do not reflect may be created, and a three-dimensional shape image of the cooking vessel may not be generated. Thus, constraints may be imposed on the vessel measuring camera P0 and the lighting devices 17.

For example, when a single lighting device is provided, or when the lighting devices gather near the vessel measuring camera, or when the vessel measuring camera is disposed at a position much lower than a position of the lighting device, a three-dimensional shape image of the cooking vessel may not be generated.

Referring to the drawing, a first arrangement 90a, a second arrangement 90b, and a third arrangement 90c respectively indicate optimal positions of the lighting device and the vessel measuring camera. A plurality of lighting devices 17 is provided and disposed at a first position of the inner surface of the tub in the form of a spot, a belt, or a band. A single vessel measuring camera P0 is provided and disposed at a second position of the inner surface of the tub.

The second position of the vessel measuring camera may be an upper portion or a lateral surface of the tub. The first arrangement 90a and the second arrangement 90b are shown when the second position is the upper portion of the tub, and the third arrangement 90c is shown when the second position is the lateral surface of the tub.

In the first arrangement 90a, the second position and the first position are at the same height with respect to a bottom of the tub, and in the second arrangement 90b, the first position is lower than the second position with respect to the bottom of the tub. In this case, there may be constraints. For example, two or more lighting devices need to be provided as the plurality of lighting devices, and an angle among the plurality of lighting devices need to be 90 degrees or greater with respect to the vessel measuring camera. By way of further example, another lighting device needs to be placed on the opposite side of the lighting device with respect to the vessel measuring camera.

When the vessel measuring camera P0 and the lighting devices 17 are disposed as in the first arrangement 90a, an error that occurs when generating a three-dimensional image of a cooking vessel can be decreased, since the lighting devices 17 light up the entire upper end portion of the rack and all the lighting devices are on the same flat surface. Additionally, when the first position is lower than the second position as in the second arrangement 90b, an error may be avoided further since an angle between the vessel measuring camera P0 and the lighting device 17 increases.

In the third arrangement 90c, there may be constraints. For example, the first position is higher than the second position, at least two lighting devices 17 are disposed in one of the two spaces set by a reference surface set in the tub, and at least three lighting devices may be disposed in the tub.

When the vessel measuring camera P0 and the lighting device 17 are disposed as in the third arrangement 90c, a far distance lighting device and a near distance lighting device may all be used. Thus, an accurate three-dimensional shape image of a cooking vessel can be generated as a result of a variety of responses regardless of a position and an arrangement of the cooking vessel.

Figure 13:
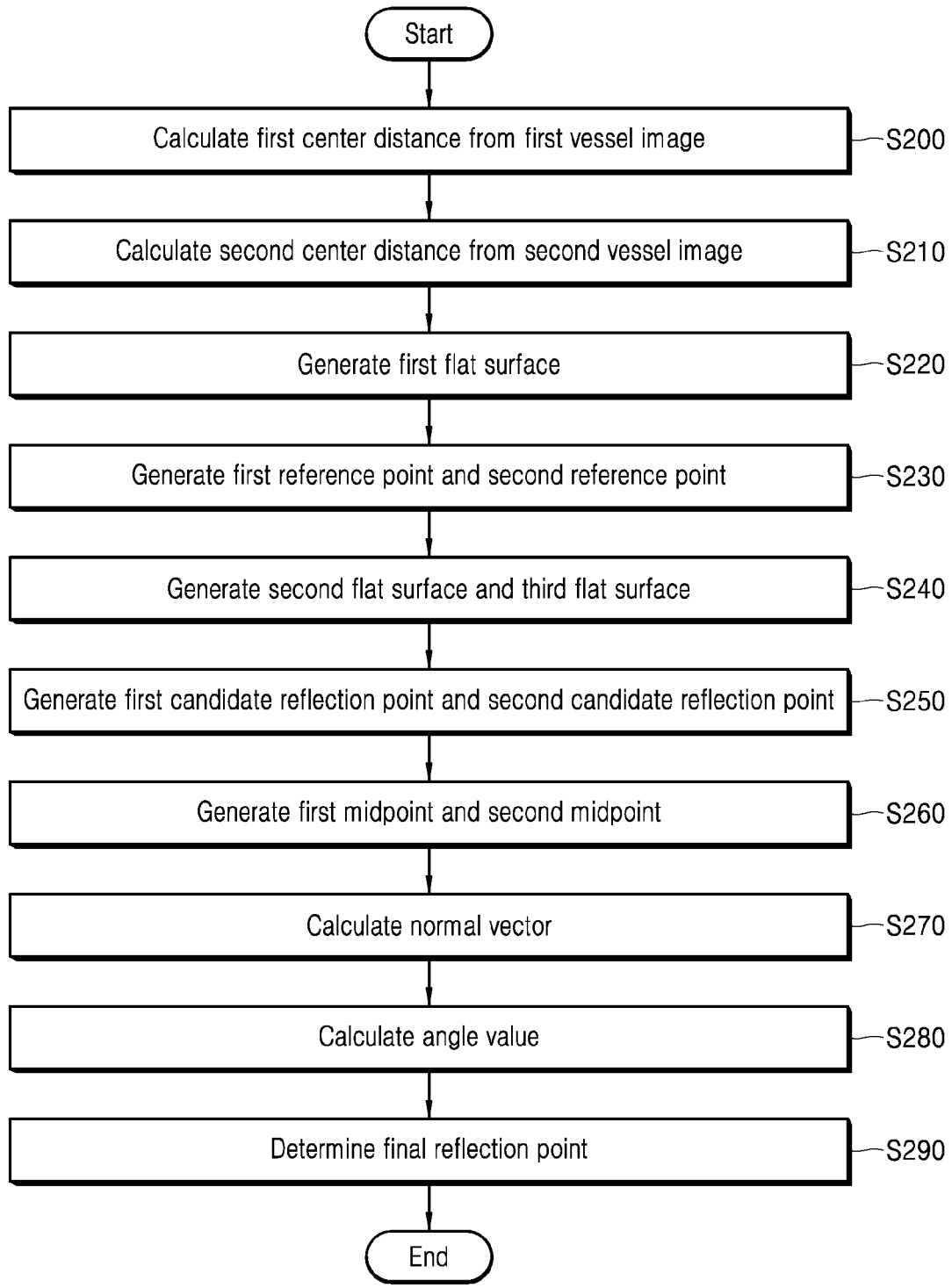
FIG. 13 is a flow chart illustrating a method for generating a shape of a cooking vessel.

FIG. 13 is a flow chart illustrating a method for generating a shape of a cooking vessel.

A controller 20 can calculate a first center distance from a first pixel that is any pixel among pixels included in a first vessel image (S200), and a second center distance from a pixel at the same position as the first pixel among pixels included in a second vessel image (S210). Then the controller 20 can generate a first flat surface A1 including a vessel measuring camera P0, a first lighting device 17a, and a second lighting device 17b (S220).

The controller 20 can generate a first reference point P3 and a second reference point P4 on the first flat surface A1 from a set of points at the first center distance from the first lighting device 17a and a set of points at the second center distance from the second lighting device 17b in a three-dimensional space (S230).

The controller 20 can generate a second flat surface A2 that is a set of points at the same distance between the first reference point P3 and the vessel measuring camera P0, and generate a third flat surface A3 that is a set of points at the same distance between the second reference point P4 and the vessel measuring camera P0 (S240).

The controller 20 can generate a first candidate reflection point Pr1 based on the vessel measuring camera P0 and the second flat surface A2, and a second candidate reflection point Pr1 based on the vessel measuring camera P0 and the third flat surface A3 (S250).

The controller 20 may generate a first midpoint Pn1 at a center of a linear distance between the first reference point P3 and the vessel measuring camera P0, and a second midpoint Pn2 at a center of a linear distance between the second reference point P4 and the vessel measuring camera P0 (S260).

The controller 20 can calculate a first normal vector V1 in a direction from the first candidate reflection point Pr1 of the first pixel to the first midpoint Pn1, and a second normal vector V1 in a direction from the second candidate reflection point Pr2 of the first pixel to the second midpoint Pn2 (S270). Then the controller 20 can calculate a third normal vector V3 and a fourth normal vector V4 from a second pixel adjacent to the first pixel, and a fifth normal vector V5 and a sixth normal vector V6 from a third pixel adjacent to the second pixel and opposite the first pixel, as described above (S280).

The controller 20 can calculate a first angle value as a result of comparison between the first normal vector V1 and the third normal vector V3, and when a second angle value calculated as a result of comparison between the third normal vector V3 and the fifth normal vector V5 matches the first angle value, the controller 20 can determine the first candidate reflection point Pr1 as a final reflection point. In some implementations, the controller 20 can calculate a third angle value as a result of comparison between the second normal vector V2 and the fourth normal vector V4, and when a fourth angle value calculated as a result of comparison between the fourth normal vector V4 and the sixth normal vector V6 matches the third angle value, the controller 20 can determine the second candidate reflection point Pr2 as a final reflection point Pr (S290). Since continuity of adjacent pixels is determined by using normal vectors, a distortion can be removed, and an accurate three-dimensional image of a cooking vessel can be generated. The controller 20 can generate a three-dimensional image of a cooking vessel by combining the final reflection points Pr.

What is claimed is:

1. A dishwasher, comprising:
    a case that defines an exterior of the dishwasher and that has an opening at a front side of the case;
    a door configured to open and close the opening of the case;
    a tub that is configured to receive water;
    a sump that is disposed in the tub;
    a rack that is disposed in the sump and that is configured to receive an object;
    a plurality of lighting devices that are disposed at a first position of an inner surface of the tub and that are configured to illuminate the rack;
    a measuring camera that is disposed at a second position of the inner surface of the tub and that is configured to capture an image of the upper end portion of the rack and generate an object image; and
    a controller configured to control operations of the dishwasher by:
        performing a first lighting control on a first subset of lighting devices among the plurality of lighting devices to illuminate the rack,
        acquiring, based on the first lighting control being performed, a first object image generated as a result of capturing of a first image of the rack by the measuring camera,
        performing a second lighting control on a second subset of lighting devices among the plurality of lighting devices to illuminate the rack,
        acquiring, based on the second lighting control being performed, a second object image generated as a result of capturing of a second image of the rack by the measuring camera, and
        generating a three-dimensional shape image of the object in the rack based on the first object image and the second object image,
    wherein the measuring camera is configured to capture the first object image and the second object image, and
    wherein the first subset of lighting devices and the second subset of lighting devices are different from each other.

2. The dishwasher of claim 1, wherein the controller is configured to:
    calculate a lighting distance from each pixel included in the first object image or the second object image,
    generate a reference point by using a coordinate of the measuring camera, coordinates of the plurality of lighting devices, and the lighting distance,
    calculate a coordinate of a candidate reflection point in a three-dimensional space by using the coordinate of the measuring camera and the reference point,
    determine a final reflection point based on the candidate reflection point, and
    generate the three-dimensional shape image of the object based on the determined final reflection point.

3. The dishwasher of claim 2, wherein the controller is configured to:
    calculate a first lighting distance based on a first pixel that is a single pixel selected from pixels included in the first object image,
    calculate a second lighting distance based on a second pixel that is at the same position as the first pixel among pixels included in the second object image,
    extract a first flat surface including the measuring camera and a first lighting device and a second lighting device of the plurality of lighting devices, and
    generate a first reference point and a second reference point by using the first lighting distance, the second lighting distance, and the first flat surface.

4. The dishwasher of claim 3, wherein the controller is configured to:
    extract a second flat surface that is defined by a set of points at a center between a three-dimensional coordinate of the first reference point and a three-dimensional coordinate of the measuring camera,
    calculate a coordinate of a first candidate reflection point in the three-dimensional space based on the measuring camera and the second flat surface,
    calculate a coordinate of a second reference point in the three-dimensional space by using the first lighting distance, the second lighting distance, and the first flat surface, extract a third flat surface that is defined by a set of points at a center between a three-dimensional coordinate of the second reference point and a three-dimensional coordinate of the measuring camera, and calculate a coordinate of a second candidate reflection point in the three-dimensional space based on the measuring camera and the third flat surface.

5. The dishwasher of claim 4, wherein the controller is configured to:

determine a first cross point and a second cross point that are defined at cross points where (i) points placed in the first flat surface and at a first lighting distance from the first lighting device meet (ii) points placed in the first flat surface and at a second lighting distance from the second lighting device, a first distance from the first cross point to the measuring camera being greater than a second distance from the second cross point to the measuring camera, determine the first cross point as the first reference point, calculate a coordinate of the first reference point, and determine the second cross point as the second reference point, and calculate a coordinate of the second reference point.

6. The dishwasher of claim 4, wherein the controller is configured to:

calculate a first normal vector connecting the first candidate reflection point and a first midpoint, calculate a second normal vector connecting the second candidate reflection point and a second midpoint, calculate a third normal vector from a third pixel and calculate a fifth normal vector from a fifth pixel in terms of the third pixel and the fifth pixel consecutively adjacent to the first pixel, calculate a fourth normal vector from a fourth pixel and calculate a sixth normal vector from a sixth pixel in terms of the fourth pixel and the sixth pixel consecutively adjacent to the second pixel, calculate a first angle value based on a comparison between the first normal vector and the third normal vector, calculate a second angle value based on a comparison between the second normal vector and the fourth normal vector, calculate a third angle value based on a comparison between the third normal vector and the fifth normal vector, calculate a fourth angle value based on a comparison between the fourth normal vector and the sixth normal vector, determine, based on the first angle value matching the third angle value and the second angle value not matching the fourth angle value, the first candidate reflection point as a final reflection point, and determine, based on the first angle value not matching the third angle value and the second angle value matching the fourth angle value, the second candidate reflection point as a final reflection point.

7. The dishwasher of claim 1, wherein, based on the second position being a lateral surface of the tub, the first position is above the second position, at least two lighting devices are disposed at one of two spaces set by a reference surface set in the tub, and at least three lighting devices are disposed in the tub, and wherein, based on the second position being an upper portion of the tub, the first position and the second position are at the same height with respect to a bottom of the tub, and an angle among the plurality of lighting devices is 90 degrees or greater with respect to the measuring camera.

8. The dishwasher of claim 1, wherein the first lighting control and the second lighting control comprise controlling the plurality of lighting devices such that the plurality of lighting devices are consecutively turned on and off or brightness of the plurality of lighting devices is adjusted.

9. A method for acquiring a three-dimensional image by a dishwasher, comprising:

performing a first lighting control on a first subset of lighting devices among a plurality of lighting devices disposed at a first position of an inner surface of a tub;

acquiring, based on the first lighting control being performed, a first object image generated as a result of capturing of a first image of a rack by a measuring camera disposed at a second position;

performing a second lighting control on a second subset of lighting devices among the plurality of lighting devices;

acquiring, based on the second lighting control being performed, a second object image generated as a result of capturing of a second image of the rack by the measuring camera; and generating a three-dimensional shape image of an object held in the rack based on the first object image and the second object image, wherein the measuring camera is configured to capture the first object image and the second object image, and wherein the first subset of lighting devices and the second subset of lighting devices are different from each other.

10. The method of claim 9, wherein generating a three-dimensional shape image of the object comprises:

calculating a lighting distance from each pixel included in the first object image or the second object image, generating a reference point by using a coordinate of the measuring camera, coordinates of the plurality of lighting devices, and the lighting distance, calculating a coordinate of a candidate reflection point in a three-dimensional space by using the coordinate of the measuring camera and the reference point, determining a final reflection point based on the candidate reflection point, and generating the three-dimensional shape image of the object based on the determined final reflection point.

11. The method of claim 10, wherein calculating a lighting distance from each pixel comprises:

calculating a first lighting distance based on a first pixel that is a single pixel selected from pixels included in the first object image, calculating a second lighting distance based on a second pixel that is at the same position as the first pixel among pixels included in the second object image, extracting a first flat surface including the measuring camera and a first lighting device and a second lighting device of the plurality of lighting devices, and generating a first reference point and a second reference point by using the first lighting distance, the second lighting distance, and the first flat surface.

12. The method of claim 11, wherein calculating a coordinate of a reflection point in a three-dimensional space comprises:

extracting a second flat surface that is defined by a set of points at a center between a three-dimensional coordinate of the first reference point and a three-dimensional coordinate of the measuring camera, calculating a coordinate of a first candidate reflection point in the three-dimensional space based on the measuring camera and the second flat surface, calculating a coordinate of a second reference point in the three-dimensional space by using the first lighting distance, the second lighting distance, and the first flat surface;

extracting a third flat surface that is defined by a set of points at a center between a three-dimensional coordinate of the second reference point and a three-dimensional coordinate of the measuring camera; and calculating a coordinate of a second candidate reflection point in the three-dimensional space based on the measuring camera and the third flat surface.

13. The method of claim 12, wherein calculating a coordinate of a first reference point in the three-dimensional space comprises:

determining a first cross point and a second cross point that are defined at cross points where (i) points placed in the first flat surface and at a first lighting distance from the first lighting device meet (ii) points placed in the first flat surface and at a second lighting distance from the second lighting device, a first distance from the first cross point to the measuring camera being greater than a second distance from the second cross point to the measuring camera, determining the first cross point as the first reference point, calculating a coordinate of the first reference point, determining the second cross point as the second reference point, and calculating a coordinate of the second reference point.

14. The method of claim 12, further comprising:

calculating a first normal vector connecting the first candidate reflection point and a first midpoint;

calculating a second normal vector connecting the second candidate reflection point and a second midpoint;

calculating a third normal vector from a third pixel and calculating a fifth normal vector from a fifth pixel in terms of the third pixel and the fifth pixel consecutively adjacent to the first pixel;

calculating a fourth normal vector from a fourth pixel and calculating a sixth normal vector from a sixth pixel in terms of the fourth pixel and the sixth pixel consecutively adjacent to the second pixel;

calculating a first angle value based on a comparison between the first normal vector and the third normal vector;

calculating a second angle value based on a comparison between the second normal vector and the fourth normal vector;

calculating a third angle value based on a comparison between the third normal vector and the fifth normal vector;

calculating a fourth angle value based on a comparison between the fourth normal vector and the sixth normal vector;

determining, based on the first angle value matching the third angle value and the second angle value not matching the fourth angle value, the first candidate reflection point as a final reflection point; and determining, based on the first angle value not matching the third angle value and the second angle value matching the fourth angle value, the second candidate reflection point as a final reflection point.

15. The method of claim 9, wherein, based on the second position being a lateral surface of the tub, the first position is above the second position, at least two lighting devices are disposed at one of two spaces set by a reference surface set in the tub, and at least three lighting devices are disposed in the tub, and wherein, based on the second position being an upper portion of the tub, the first position and the second position are at the same height with respect to a bottom of the tub, and an angle among the plurality of lighting devices is 90 degrees or greater with respect to the measuring camera.

16. The method of claim 9, wherein the first lighting control and the second lighting control comprise controlling the plurality of lighting devices such that the plurality of lighting devices are consecutively turned on and off or brightness of the lighting devices is adjusted.

17. The dishwasher of claim 1, wherein the measuring camera is configured to, based on the first lighting control being performed by the first subset of lighting devices and the second lighting control being performed by the second subset of lighting devices, capture the first image and the second image at different times.

18. The method of claim 9, wherein the first image and the second image are captured at different times based on the first lighting control being performed by the first subset of lighting devices and the second lighting control being performed by the second subset of lighting devices.

* * * * *